United States Patent [19]
Molnar

[11] 4,446,788
[45] May 8, 1984

[54] UNIVERSAL SCREW PRESS BUILT IN MODULAR SYSTEM

[75] Inventor: Zoltan Molnar, Budapest, Hungary

[73] Assignee: Licencia Talalmanyokat Ertekesito V., Budapest, Hungary

[21] Appl. No.: 355,915

[22] Filed: Mar. 8, 1982

[51] Int. Cl.³ .............................. B30B 9/06; B30B 9/14
[52] U.S. Cl. ..................................... 100/117; 100/128; 100/129; 100/145
[58] Field of Search ........................ 100/93 S, 117, 145, 100/146, 147, 148, 149, 150, 127–129; 366/319

[56] References Cited

U.S. PATENT DOCUMENTS

| 806,991 | 12/1905 | Oliver | 100/127 X |
| 1,765,389 | 6/1930 | Wendler | 100/117 |
| 1,851,191 | 3/1932 | Lang | 100/148 X |
| 2,014,636 | 9/1935 | Rosendahl | 366/319 X |
| 3,130,666 | 4/1964 | Hiller | 100/93 S |
| 3,592,128 | 7/1971 | French | 100/145 |
| 4,279,197 | 7/1981 | Hunt et al. | 100/117 |
| 4,297,943 | 11/1981 | Laurich-Trost | 100/129 |
| 4,312,265 | 1/1982 | Enterline et al. | 366/319 X |

FOREIGN PATENT DOCUMENTS

461388  2/1937  United Kingdom ............... 15/117

Primary Examiner—Peter Feldman
Attorney, Agent, or Firm—Anthony H. Handal

[57] ABSTRACT

A screw press built in a modular system is disclosed. Included are a driving gear, wormshaft, and a housing provided with an impact cone and a perforated wall. The size of the perforations is variable during operation.

10 Claims, 19 Drawing Figures

UNIVERSAL SCREW PRESS BUILT IN MODULAR SYSTEM

TECHNICAL FIELD OF THE INVENTION

The invention relates to a universal screw press built in a modular system with a driving gear, a worm shaft, and a housing provided with an impact cone and a perforated wall, where the size of the perforations is variable during operation.

BACKGROUND OF THE INVENTION

Many screw presses are known in the literature and in practice, especially in the food and chemical industry. Their common characteristic is that the revolving worm shaft carries the material to be separated in a housing with a perforated wall. The cross section of the housing narrows in the direction of the material transfer, thereby realizing the pressing effect. An impact element is used for increasing the pressing effect. The solid component of the material passing through the housing with a perforated wall leaves the apparatus at the impact element, while losing some of the material's liquid content. The liquid exits by way of the perforation.

Many alternative embodiments of screw presses are known. Each includes the above-noted basic elements, but fundamentally different solutions exist with respect to their details and supplementary units. The common disadvantage of the known apparatuses is the inefficient separation, as a result of which the required organoleptic and chemical purity cannot be ensured for the separated phases. The apparatuses are suitable mostly for one kind of separation process without being adaptable to other kinds. The processes (heat treatment, mixing of additives, etc.) preceding the pressing and determining the separation capability are carried out generally in several series-connected apparatuses, or in those built next to each other. Thus the processing time is prolonged, and the process becomes more expensive.

Such apparatuses are already known which are assembled with replaceable elements (for instance, according to the GFR patent specification No. 2,730,473), as well as such presses the screw of which is assembled from several parts (GFR patent specification No. 1,944,642). Such apparatuses also in which the housing is provided with a double jacket in order to adjust the temperature of the material within (GB patent patent specification No. 1251072).

These solutions are aimed at accomplishing as many different tasks as possible with the screw press and at providing a relatively wide range of variation of the pressing parameters.

However, the fundamental shortcoming of these solutions is the inefficient separation. This is due first of all to the constant size of the perforations of the elements. It is known that the perforated element acts in two different ways during its application: it retains the solid component and by compacting the solid component it prevents the liquid component from escaping. If the size of an element of solid material (the fiber) is substantially smaller than the size of the perforation, then a certain part of the solid material penetrates the perforation, sticking to the wall, while another part falls through the perforation, thereby reducing the efficiency of separation. At the same time the size of the perforation is gradually reduced by the adhering fibers. If the fibers are substantially larger than the perforation, they arch over the perforation and thereby increase the flow resistance. Naturally, many other variations may occur between the above two extreme cases, including the simultaneous occurrence of the extreme cases.

Formation of the suitable perforation is further aggravated by the fact that the layer of solid material in the immediate vicinity of the perforation has a texture that is fundamentally different from that of the rest of the solid material. This is due to the periodic development and destruction of the two extreme cases. The composition of this marginal layer is fundamentally determined by the size and distribution of the perforations. The filtering effect is inversely proportional to the joint resistance of the marginal layer of solid material and the perforated element.

Thus it becomes obvious that not only would each particular application of the screw press require a different perforation pattern, but in the optimal case even a single application would require variable size of the perforations.

Elements with variably sized perforations are also known. One such element is disclosed in the British patent specification No. 1,000,773. Here the perforated element consists of bars placed next to each other, between which the required gap size is maintained by pieces, e.g., balls. The fundamental disadvantage of this solution is that the gap size can be altered only by disassembly of the apparatus. This required procedure restricts the universal applicability of the apparatus, since changing the perforation size requires shutdown and significant downtime, and also it does not allow readjustment in response to changed conditions in the given technological process.

SUMMARY OF THE INVENTION

The present invention is aimed at the realization of a solution such that the efficiency of separation can be increased by adjustment of the perforation size during operation, i.e., the size of the perforation is varied according to changes in the properties of the material during operation. Thus the filtering effect can be kept at a constant value.

The problem is solved according to the invention by an apparatus provided with a driving gear, a worm shaft, an impact cone, and a housing having perforated walls, in which one of the housing units in the apparatus provided with the worm shaft assembled from units has perforations which vary in size during operation, these perforations being formed between at least two elements displaceable in relation to each other, and at least one element being connected to the driving gear. The jacket of the housing unit provided with perforations of variable size may be formed from two concentric tubes rotatable with respect to each other and provided with perforations. The tubes may be formed by perforated plates, or by jacket segments oriented along the longitudinal axis. In a given case it is advisable to place a filter element between the two tubes, or inside the perforations of the inner tube.

The jacket of the housing unit provided with perforations of variable size may be formed from interlocking racks arranged in the direction of the longitudinal axis and rotatable about their longitudinal axis. The jacket may alternatively be formed from wedged bars similarly interlocking with each other, arranged in the direction of the longitudinal axis and radially movable in relation to each other.

According to a further embodiment, the jacket of the housing unit provided with perforations of variable size consists of rotatable rings provided with radially arranged grooves.

The fundamental advantage of the solution according to the present invention is, that variation of the extent of the filtering effect during operation allows the simultaneous variation of the main parameters influencing the separation of the two-phase system without shutdown and disassembly of the apparatus. The optimization results in improved hydromechanical separation of the components of the material and in improved chemical properties of the separated components.

The apparatus is built up from housing units according to the principle of building blocks, the worm shaft is assembled from threaded units, threadless units, and mixing units according to the properties of the system to be pressed, whereby optimal pressure distribution is ensured along the full length of the worm shaft. The worm shaft is rotated in the housing provided with axial slots of variable size, whereby the separation effect can be influenced, during driving of the worm shaft by the stepless driving gear and in this way the adjustment during operation can be realized.

Further details of the invention are described with the aid of the following drawings showing the construction by way of example:

PREFERRED EMBODIMENTS OF THE INVENTION

Figure 1:
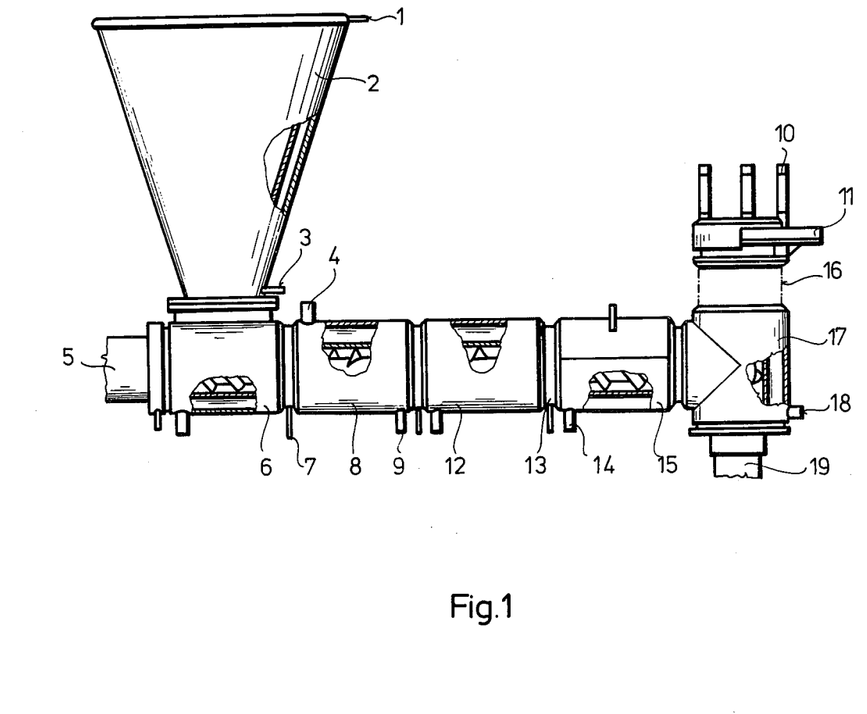
FIG. 1 is a side view showing a partial section of the apparatus according to the invention.

FIG. 1 is a diagrammatic illustration of a preferred embodiment of the present invention without the drive and machine stand. The housing assembled according to the principle of building blocks consists of a double-walled, tempered receiving funnel 2, a double-walled throat unit 6, a double-walled control unit 8, a perforated unit 12 with constant-sized perforations, a perforated unit 15 with variably sized perforations, a rotatable chamber 17, and an outlet throat 11. The housing units are held together with separators 13 with the aid of hollow screws 16. The housing units are fixed to the stand via legs 7. The worm shaft is driven by stepless driving gear through end-journal bearings 5 and 19. The flexible support of the impact cone arranged in the outlet throat 11 is ensured by hydraulic elements 10. The perforated tube 1 arranged on the receiving funnel 2 allows the admission of liquid additives. Inlet and outlet of the tempering medium into and out of the double-walled tempered units are ensured by stubs 3, 4 and 9, 18, respectively. Flow of the separated liquid component from the perforated unitds having perforations of constant and variable size is ensured by stubs 14.

In addition, certain housing units may be provided which such stubs, with the aid of which optimal treating medium can be fed to the pressed material. Naturally these units are provided with liquid-carrying stubs as well.

Figure 2:
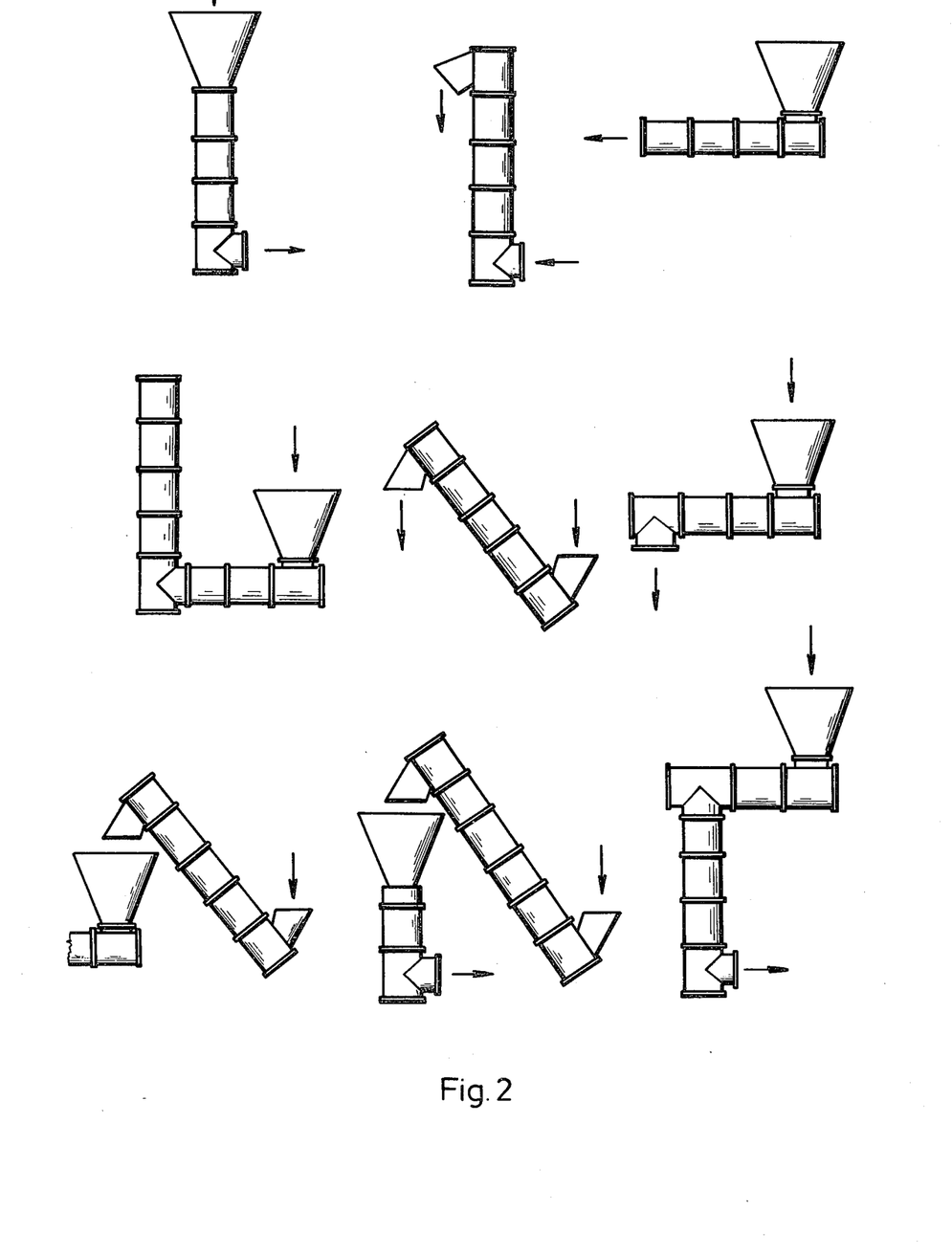
FIG. 2 shows various possible arrangements assembled from the units comprising the modular system according to the invention.

FIG. 2 shows some embodiments of the present invention assembled from the housing unis presented in FIG. 1 again without depicting the drive and machine stand.

Figure 3A:
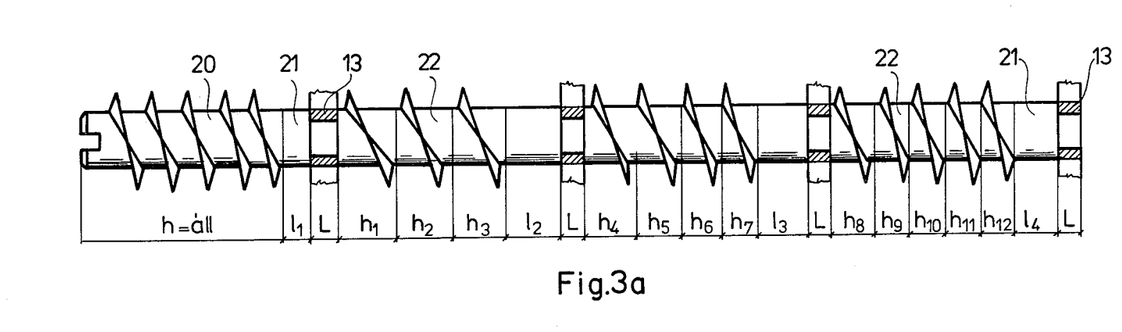
FIGS. 3a and 3b show two possible embodiments of the worm shaft pertaining to the apparatus wherein the worm shaft is assembled from units.
Figure 3B:
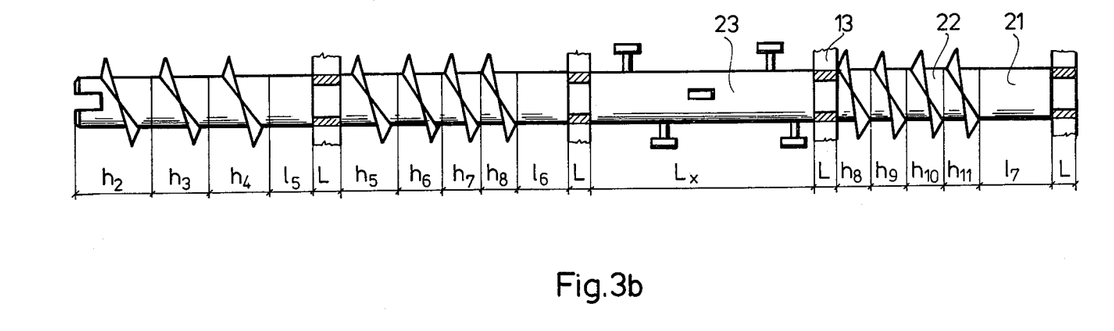
Figure 4:
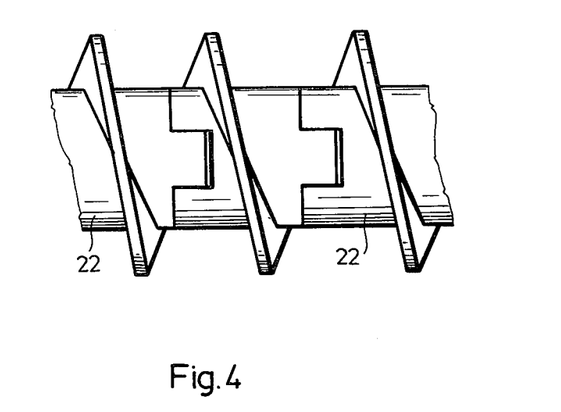
FIG. 4 shows the method of connecting the worm shaft units.

FIG. 3 shows two embodiments of the worm shaft assembled by way of example from units with pitch varying turn by turn and arranged in the housing units. The screw-feeder 20 with the threadless worm unit 21 ensures the conveyance of the material within the first housing unit. Separator 13 holds the housing units together and carries the worm shaft in a bearing. Depending on the properties of the material to be pressed, the worm shaft is assembled from worm shaft units 22 of varying pitch h with the aid of the threadless worm units 21 of varying length 1. The mixing unit 23 ensures the loosening and mixing of the material to be pressed. The spoked separators 13—in addition to holding together the housing units and carrying the shaft in various bearings—ensure the mixing of the material as well. The worm shaft units 22 are coupled to each other, for instance, as shown in FIG. 4, and may be conveniently decoupled. The retentivity radial alignment of the shaft are ensured by the housing units.

The worm shaft is turned by an electric motor (not shown in the diagrams) via an infinitely variable driving gear and/or speed reducing gear.

Figure 5:
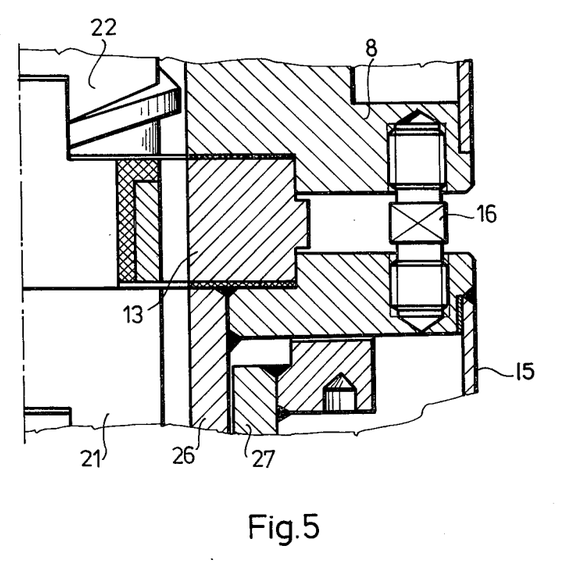
FIG. 5 is a sectional view showing the joints between adjacent housing units.
Figure 6:
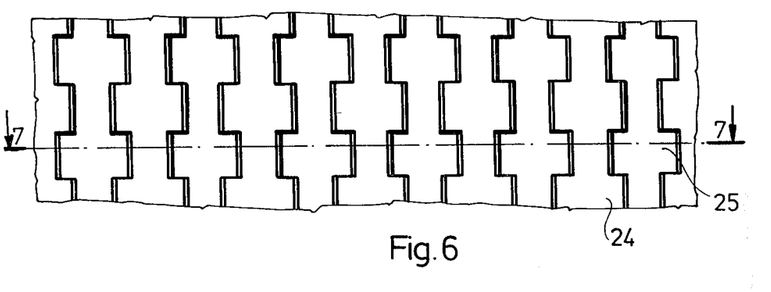
FIG. 6 is a top view of the racks forming the variably sized axial slots.
Figure 7:
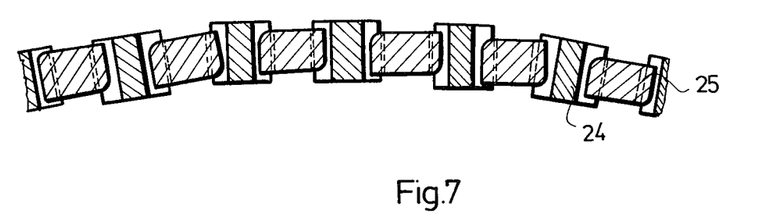
FIG. 7 is a sectional view along line 7—7 shown in FIG. 6.
Figure 8:
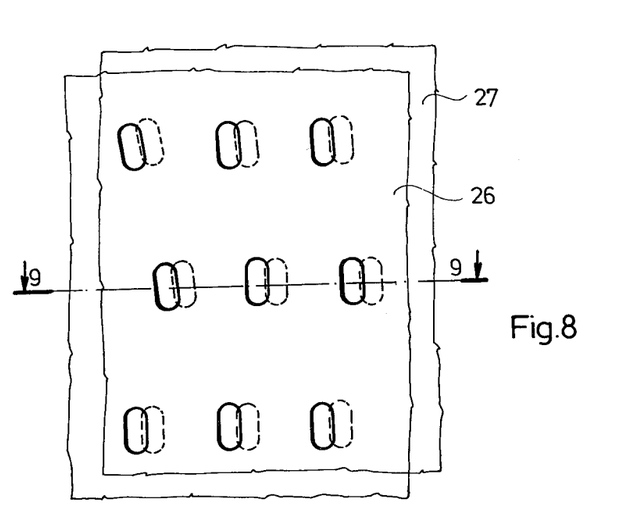
FIG. 8 shows an alternative embodiment of the housing to provide variably sized axial slots.
Figure 9:
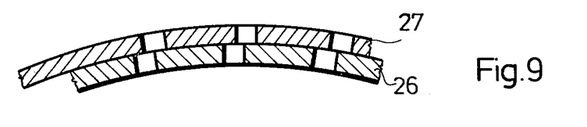
FIG. 9 is a sectional view along line 9—9 shown in FIG. 8.

FIG. 5 illustrates a possible method of connecting the housing units in series. FIGS. 6, 7 and 8, 9 show two possible embodiments of the housing provided with axial slots of variable size. According to one embodiment, the variably sized perforation is formed by racks 24 and 25 which are rotatable about the axis of the shaft. The plan view of this embodiment is shown in FIG. 7. The gear between the teeth provides the slots (perforations) of the housing, the size of which varies with the rotation of the racks. According to another embodiment, the housing consists of inner tube 26 and outer tube 27 rotatable with respect to each other. The tubes are provided with large-sized perforations, the plan view of which is shown in FIG. 8 and the sectional view in FIG. 9. The slots of variable size are provided by the variable overlap of the perforations during the rotation of the tubes with respect to each other.

Figure 10:
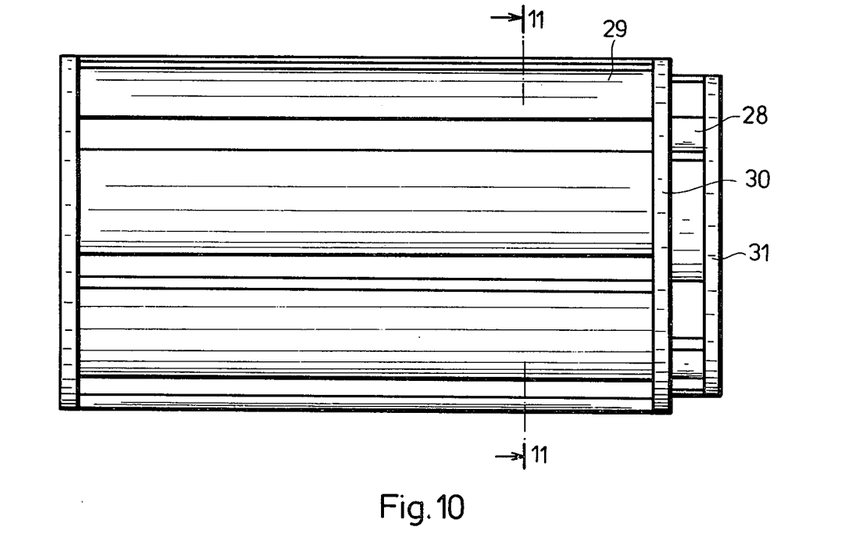
FIG. 10 is a side view showing a further embodiment of the housing to provide variably sized perforations.
Figure 11:
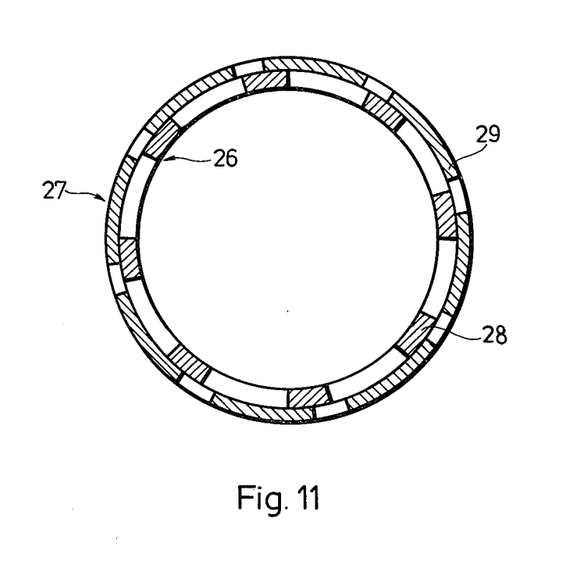
FIG. 11 is a sectional view along line 11—11 of the embodiment shown in FIG. 10.

FIGS. 10 and 11 show another embodiment of the tubes rotatable in relation to each other. Here the inner tube 26 and outer tube 27 consist of jacket segments 28 and 29, respectively. The jacket segments 28 and 29 are oriented along the longitudinal axis and fixed in rings 30 and 31, respectively. The slot size can be varied by rotating the inner tube 26 and outer tube 27 in relation to each other.

Figure 12:
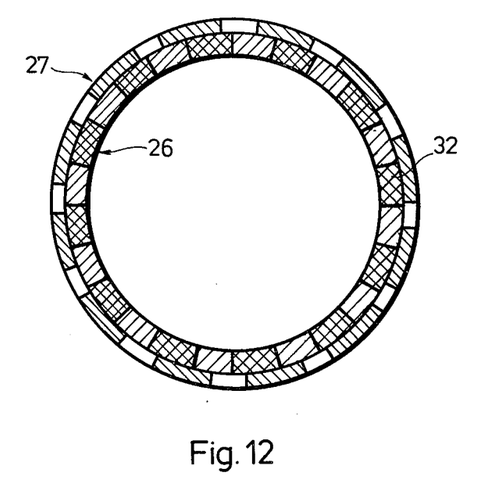
FIG. 12 is a sectional view of the embodiment shown in FIGS. 8-11 provided with filter element.

In order to increase the filtering effect, a porous filter medium 32 can be inserted in the slots of the inner tube 26 as shown in FIG. 12. When the filter medium 32 is saturated, the inner tube 26 and outer tube 27 are brought into the covered perforation position and the filter medium 32 is replaced.

Figure 13:
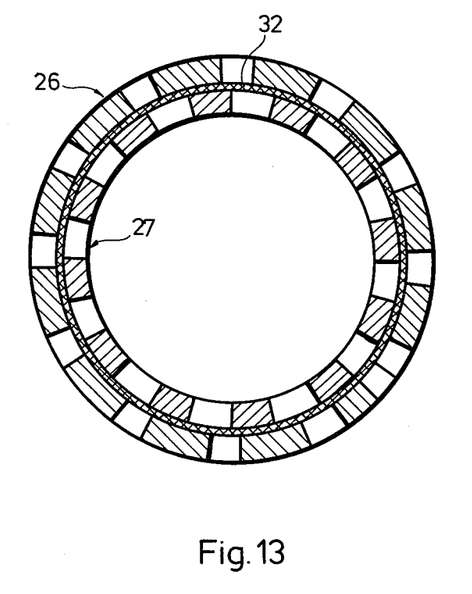
FIG. 13 is a sectional view of an alternative embodiment showing the arrangement of the filter element.

A further embodiment for increasing the filtering effect is shown in FIG. 13, where similarly a filter medium 32 is arranged between the inner tube 26 and outer tube 27. This filter medium is preferably a layer of fabric in this case.

Figure 14:
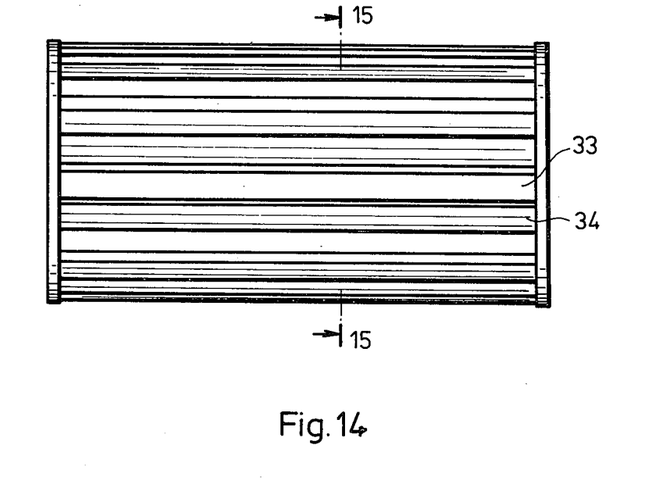
FIG. 14 is a side view showing a further embodiment of the housing for realizing perforations of variable size.
Figure 15:
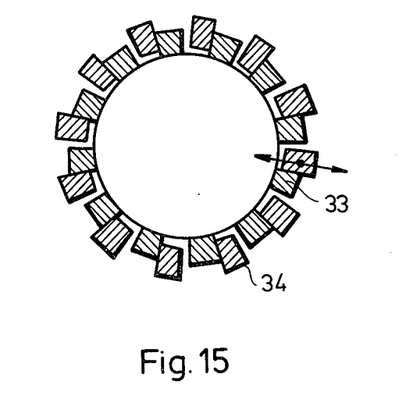
FIG. 15 is a sectional view along line 15—15 shown in FIG. 14.

FIGS. 14 and 15 show a further embodiment in which the housing unit with variably sized perforations is comprised of wedge-shaped slats 33 and 34 radially displaceable in relation to each other. The perforation size is optionally made variable by the radial displacement of slats 34.

Figure 16:
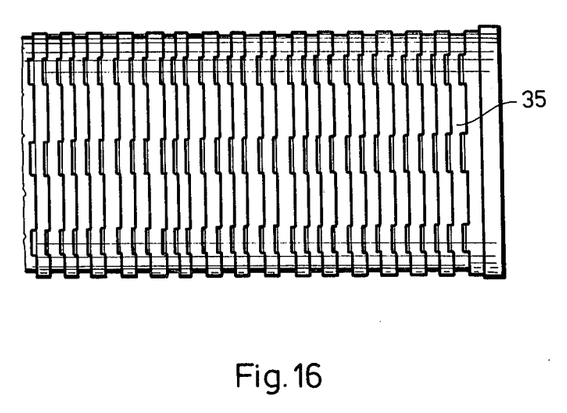
FIG. 16 is a side view showing a further embodiment of the housing for realizing perforations of variable size.
Figure 17A:
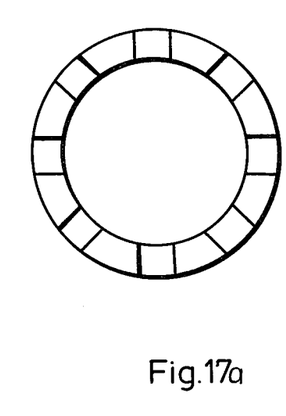
FIG. 17a and 17b is a front and side view of one of the elements of the embodiment shown in FIG. 16.
Figure 17B:
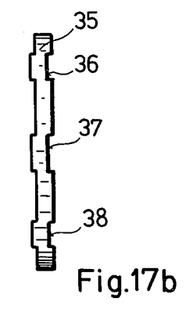

According to the embodiment shown in FIGS. 16 and 17, the housing unit with variably sized perforations is comprised of rings 35 which are grooved on both sides. The depth of the grooves 36, 37, and 38 varies. Thus, by the axial rotation of the rings 35, different perforation sizes can be achieved. Variation of the perforation size during operation can be attained by relaxing the axial compression.

An optional number of adjustable-perforation-size units can be arranged in series and the perforation size best suited to the character of the material can be prearranged in each element. The material is carried and pressed against the interior surface of the housing by a jointed worm shaft assembled according to the rheological properties of the material. The jointed units of the worm shaft can be decoupled for disassembly.

The various surface formations of the perforations of variable size, such as cylindrical, flat, calotte, etc., may be used to advantage in case of two-phase systems.

According to our measurements the best separation is provided by slots (axial slots in the case of tubes). Their arrangement (distribution) is based on operational dimensioning.

The apparatus according to the invention functions as follows:

The modular apparatus is assembled from the housing and worm units by linking together in series a sufficient number of heating and perforated units in accordance with the processing-technological requirements.

The material to be separated (solid-liquid system) is fed into the receiving funnel 2. The constant mass of material in the funnel ensures the proper filling of the worm cylinder. (In the case of material that is inclined to arch over, a mixer can be placed in the funnel.) The two-phase material to be separated is passed in between the threads of the worm, where as a result of axial compression in the direction of travel of the material separation of the phases begins. The compression is produced by reducing the pitch or by increasing the cross-sectional area of the worm shaft, or by the combination of both. By reduction of the pitch is meant increasing the number of turns of the thread per unit length of the worm shaft. The worm shaft is assembled according to the rheological properties of the two-phase system to be separated. Part of the separated liquid phase (the part already separated during the pretreatments) flows out through the jacket of the housing provided with perforations of constant size, while the remaining part passes out through the housing surface provided with slots of variable size. The outflowing liquid component should have no solids at all or only in minimal quantity. This requirement is ensured by adjustment of the slot during operation. The impact cone arranged in the outlet throat 11 is used for intensifying the pressure of the press, providing an adjustable resistance to the flow of the solid phase along its path.

Variation of the size of the slots and adjustment of the resistance of impact cone are carried out by a common hydraulic system or, in case of smaller apparatus, by a mechanical system.

In the process of separation the required pressing temperature is adjustable with the aid of the temperable housing elements. This feature entails many processing-technological advantages.

In view of the above, it is apparent that the apparatus according to the invention allows one to carry out all functions determining the perfect separation of a solid-liquid phase system in a simple apparatus in such a way, that the required parameters can be varied within wide limits. The consuming and nutritive value of the separated components can be maintained at optional value and the favorable properties can be realized in any component.

The screw press of the modular system described above with the aid of the diagrams is capable of ensuring the constant purity of the separated components of the solid-fluid phase system through the perforations of variable size—in spite of the varying parameters—since the resistance to through-flow can be kept at a constant value. This advantage is applicable in many other branches of the filtering technique.

I claim:

1. A universal screw press comprising
   (a) an inlet unit;
   (b) a driving gear;
   (c) a modular worm shaft;
   (d) an outlet unit; and
   (e) a modular housing,
wherein said modular housing comprises a first perforated housing unit provided with perforations the sizes of which are variable during operation, wherein the variably sized perforations of said first perforated housing unit are formed by a first and a second element of said first perforated housing unit, said first and second elements being displaceable in relation to each other during operation, wherein said first element of said first perforated housing unit is a perforated outer tube, said second element of said first perforated housing unit is a perforated inner tube, said inner and outer tubes have a common longitudinal axis are in contact and are rotatable with respect to one another about said longitudinal axis.

2. A universal screw press as in claim 1 wherein said inner and outer tubes are made of perforated plate.

3. A universal screw press as in claim 1 wherein said inner and outer tubes are comprised of jacket segments oriented parallel to the longitudinal axis and separated by slots, the ends of said jacket segments being fixed in circular rings.

4. A universal screw press as in claim 2 wherein a filter element is arranged between said inner and outer tubes.

5. A universal screw press as in claim 3 wherein a filter element is arranged between said inner and outer tubes.

6. A universal screw press as in claim 2 wherein filter elements are inserted in the perforations of said inner tube.

7. A universal screw press as in claim 3 wherein filter elements are inserted in the perforations of said inner tube.

8. A universal screw press comprising
   (a) an inlet unit;
   (b) a driving gear;
   (c) a modular worm shaft;
   (d) an outlet unit; and
   (e) a modular housing,
wherein said modular housing comprises a first perforated housing unit provided with perforations the size of which are variable during operation, wherein the variably sized perforations of said first perforated housing unit are formed by a first and a second element of said first perforated housing unit, said first and second elements being displaceable in relation to each other during operation, wherein said first and second elements of said first perforated housing unit comprise interlocking racks oriented parallel to the longitudinal axis, said interlocked racks being rotatable about said longitudinal axis and displaceable along the circumferential axis with respect to each other, but not displaceable along the longitudinal axis with respect to each other.

9. A universal screw press comprising
   (a) an inlet unit;
   (b) a driving gear;
   (c) a modular worm shaft;
   (d) an outlet unit; and
   (e) a modular housing;
wherein said modular housing comprises a first perforated housing unit provided with perforations the sizes of which are variable during operation, wherein the variably sized perforations of said first perforated housing unit are formed by a first and a second element of said first perforated housing unit, said first and second elements being displaceable in relation to each other during operation, wherein said first and second elements of said first perforated housing unit comprise wedge-shaped slats oriented parallel to the longitudinal axis and displaceable along the radial axis with respect to each other.

10. A universal screw press comprising
   (a) an inlet unit;
   (b) a driving gear;
   (c) a modular worm shaft;
   (d) an outlet unit; and
   (e) a modular housing,
wherein said modular housing comprises a first perforated housing unit provided with perforations the sizes of which are variable during operation, wherein the variably sized perforations of said first perforated housing unit are formed by a first and a second element of said first perforated housing unit, said first and second elements being displaceable in relation to each other during operation, wherein said first and second elements of said first perforated housing unit comprise rings provided with radial grooves, said rings being positioned contiguously along a longitudinal axis and being rotatable with respect to each other about said longitudinal axis.

* * * * *